(12) United States Patent
Yoneda et al.

(10) Patent No.: US 7,262,538 B2
(45) Date of Patent: Aug. 28, 2007

(54) CONCENTRATED WINDING STATOR COIL FOR AN ELECTRIC ROTARY MACHINE

(75) Inventors: Shigenori Yoneda, Oobu (JP); Soichi Yoshinaga, Nagoya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/114,052

(22) Filed: Apr. 26, 2005

(65) Prior Publication Data

US 2005/0236921 A1    Oct. 27, 2005

(30) Foreign Application Priority Data

Apr. 26, 2004 (JP) ............................. 2004-130175

(51) Int. Cl.
*H02K 1/00* (2006.01)
*H02K 19/26* (2006.01)
*H02K 11/00* (2006.01)

(52) U.S. Cl. .................. 310/179; 310/71; 310/180
(58) Field of Classification Search ............... 310/179, 310/180, 182, 183, 189, 190, 71
See application file for complete search history.

(56) References Cited

U.S. PATENT DOCUMENTS

| | | | | | |
|---|---|---|---|---|---|
| 4,794,361 | A | * | 12/1988 | Young | .................. 336/189 |
| 5,852,335 | A | * | 12/1998 | Suzuki et al. | ................ 310/254 |
| 5,900,687 | A | * | 5/1999 | Kondo et al. | ................. 310/71 |
| 6,255,756 | B1 | * | 7/2001 | Richter | ....................... 310/208 |
| 6,335,582 | B1 | * | 1/2002 | Abukawa et al. | ............ 310/214 |
| 6,630,766 | B1 | | 10/2003 | Kirn et al. | |
| 2002/0047365 | A1 | * | 4/2002 | Yagyu et al. | ................. 310/71 |
| 2002/0130581 | A1 | * | 9/2002 | Arai et al. | .................... 310/215 |
| 2002/0163275 | A1 | * | 11/2002 | Hsu | ............................ 310/194 |
| 2003/0098630 | A1 | * | 5/2003 | Owada et al. | ............... 310/259 |
| 2003/0201688 | A1 | * | 10/2003 | Yamamura et al. | ......... 310/216 |
| 2006/0033395 | A1 | * | 2/2006 | Izumi et al. | ................ 310/208 |

FOREIGN PATENT DOCUMENTS

| | | |
|---|---|---|
| EP | 0 920 107 A2 | 6/1999 |
| EP | 1 193 829 A2 | 4/2002 |
| FR | 2 830 994 | 4/2003 |
| JP | A 2001-186703 | 7/2001 |
| JP | A 2002-112484 | 4/2002 |
| JP | A 2002-305849 | 10/2002 |
| JP | 2003164081 A * | 6/2003 |
| JP | 2003259591 A * | 9/2003 |
| WO | 3096515 A1 * | 11/2003 |

* cited by examiner

*Primary Examiner*—Burton Mullins
*Assistant Examiner*—Erik Preston
(74) *Attorney, Agent, or Firm*—Oliff & Berridge, PLC (57) ABSTRACT

A tooth coil of a concentrated winding stator includes a first layer coil arranged by successively winding a flat type wire around a tooth in a direction advancing from a proximal end portion to a distal end portion of the tooth and a second layer coil arranged by successively winding the wire around and on the first layer coil in a direction advancing from the distal end portion to the proximal end portion of the tooth. The second layer coil of the tooth coil has no turn at a most proximal end portion of the tooth corresponding to a start turn of the first layer coil, so that the tooth coil has an odd turn number.

9 Claims, 7 Drawing Sheets

CONCENTRATED WINDING STATOR COIL FOR AN ELECTRIC ROTARY MACHINE

CROSS-REFERENCE TO RELATED APPLICATION

This application is based upon and claims the benefit of priority from earlier Japanese Patent Application No. 2004-130175 filed on Apr. 26, 2004 so that the description of which is incorporated herein by reference.

BACKGROUND OF THE INVENTION

The present invention relates to a concentrated winding stator coil for an electric rotary machine.

A concentrated winding stator, conventionally proposed in the field of electric rotary machines, includes a plurality of phase windings each consisting of same phase coils connected with each other and wound in a concentrated manner around respective teeth of a stator core (hereinafter, referred to as tooth coils). From requirements of the winding work, this kind of concentrated winding stator is generally used for an assembled core which is formed by assembling separated partial cores of respective teeth into a stator core.

The tooth coils of a concentrated winding stator are wound around the teeth to have a required turn number. Two neighboring turns are usually disposed to be adjacent to each other in the axial direction on a circumferential surface of the tooth. The winding order for this concentrated winding stator is as follows.

First, the winding operation starts from one radial end side of a tooth to the other radial end side of this tooth to arrange a first layer coil. Then, turning the advancing direction, the winding operation restarts from the other radial end side of the tooth to the one radial end side of this tooth. Thus, a second layer coil is arranged on the first layer coil. Similarly, a third layer coil is arranged on the second layer coil so as to realize a highly densified winding. The first layer coil, the second layer coil, and the third layer coil are collectively referred to as "layer coils", in the following description.

Figure 9:
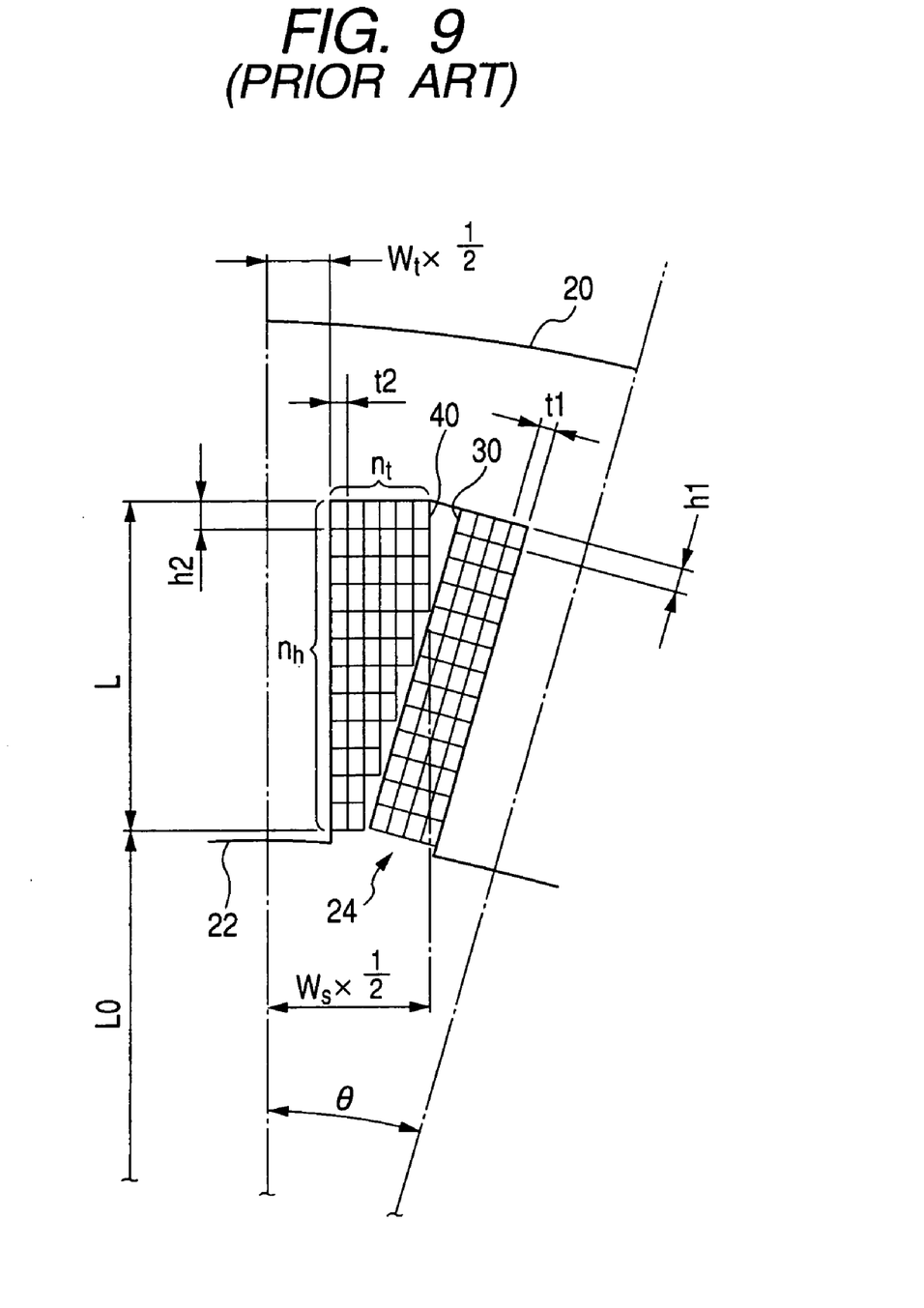
FIG. 9 is an exploded perspective view showing a stator using conventional concentrated winding stator coils.

The Japanese patent application Laid-open No. 2002-112484 (hereinafter referred to as prior art 1) proposes, in order to improve a slot space factor, to alternately dispose tooth coils wound around teeth each having a trapezoidal cross section in the radial direction and tooth coils wound around teeth each having a rectangular cross section in the radial direction, based on the fact that the circumferential width of each tooth is constant and a slot is widened in the radial direction from its inside to the outside (refer to FIG. 9). The Japanese patent application Laid-open No. 2001-186703 (hereinafter referred to as prior art 2) discloses, as a tooth coil winding arrangement for a concentrated winding stator, a tooth coil with a starting end disposed at a proximal end portion (or distal end portion) of a tooth and a terminal end disposed at a distal end portion (or proximal end portion) of the tooth. Furthermore, this prior art document discloses, as another tooth coil winding arrangement, a tooth coil with starting and terminal ends being both disposed at the distal end portion of a tooth.

However, the tooth coils disclosed in the prior art 1 are complicated to manufacture. As the trapezoidal tooth coils have a large circumferential width, the axial length of a stator inevitably increases by an amount corresponding to the axial length of this trapezoidal tooth coils.

On the other hand, the tooth coils disclosed in the above-described prior art 2 have the following problems. First, in the process of arranging a phase winding by connecting tooth coils of the same phase via crossovers in serial or parallel to each other, at least one end of each tooth coil is positioned at the distal end portion of the tooth. In the case of using short crossovers, the crossovers or lead wires extending from end portions of the tooth coils and connected to the crossovers will be positioned very closely to the circumferential surface of a rotor. If these wires are loosened and subjected to vibrations, there will be the possibility that the wires contact with the rotor or installation work for the rotor will become complicated. Furthermore, the connection by means of a crossover between one end of a tooth coil existing at the distal end portion of a tooth and one end of other tooth coil needs to be performed at the outside of an end face of the tooth in the axial direction. Thus, the axial length of the concentrated winding stator increases. Furthermore, the crossover needs to be disposed on the tooth coil wound around the tooth. Accordingly, the axial length of the stator further increases.

SUMMARY OF THE INVENTION

In view of the above-described problems, the present invention has an object to provide a concentrated winding stator coil for an electric rotary machine having a wiring arrangement preferable for proximal end extraction type two-layer winding tooth coils.

In order to accomplish the above and other related objects, the present invention provides a first concentrated winding stator coil for an electric rotary machine including plural tooth coils respectively wound around teeth of a stator core. Each tooth coil includes a first layer coil, a second layer coil, a winding start end, a winding terminal end, and a pair of lead wire portions. The first layer coil consists of plural turns arranged by successively winding an insulation coated coil conductor around a tooth of the stator core in a direction advancing from a proximal end portion to a distal end portion of the tooth to cooperatively form a same layer. The second layer coil consists of plural turns, including a start turn continuously returned from a final turn of the first layer coil, arranged by successively winding the insulation coated coil conductor on and around the first layer coil in a direction advancing from the distal end portion to the proximal end portion of the tooth to cooperatively form a same layer. The winding start end and the winding terminal end are disposed at the proximal end portion of the tooth. And, the lead wire portions extend from the winding start end and the winding terminal end toward a core back of the stator core. Furthermore, according to the first concentrated winding stator coil of the present invention, the second layer coil of the tooth coil has substantially no turn at a most proximal end portion of the tooth corresponding to the proximal end turn of the first layer coil, so that the tooth coil has an odd turn number.

Furthermore, to accomplish the above and other related objects, the present invention provides a second concentrated winding stator coil for an electric rotary machine, including plural tooth coils respectively wound around teeth of a stator core. Each tooth coil includes a first layer coil, a second layer coil, third layer coil, a winding start end, a winding terminal end, and a pair of lead wire portions. The first layer coil consists of plural turns arranged by successively winding an insulation coated coil conductor around a tooth of the stator core in a direction advancing from a proximal end portion to a distal end portion of the tooth to cooperatively form a same layer. The second layer coil consists of plural turns, including a start turn continuously returned from a final turn of the first layer coil, arranged by successively winding the insulation coated coil conductor on and around the first layer coil in a direction advancing from the distal end portion to the proximal end portion of the tooth to cooperatively form a same layer. The winding start end and the winding terminal end are disposed at the proximal end portion of the tooth. The lead wire portions extend from the winding start end and the winding terminal end toward a core back of the stator core. According to the second concentrated winding stator coil of the present invention, third layer coil is disposed on and around the second layer coil. And, the third layer coil consists of only one turn disposed at a most proximal end portion of the tooth corresponding to the proximal end turn of the second layer coil, so that the tooth coil has an odd turn number.

Furthermore, to accomplish the above and other related objects, the present invention provides a third concentrated winding stator coil for an electric rotary machine, including plural tooth coils respectively wound around teeth of a stator core. Each tooth coil includes a first layer coil, a second layer coil, a winding start end, a winding terminal end, and a pair of lead wire portions. The first layer coil consists of plural turns arranged by successively winding an insulation coated coil conductor around a tooth of the stator core in a direction advancing from a proximal end portion to a distal end portion of the tooth to cooperatively form a same layer. The second layer coil consists of plural turns, including a start turn continuously returned from a final turn of the first layer coil, arranged by successively winding the insulation coated coil conductor on and around the first layer coil in a direction advancing from the distal end portion to the proximal end portion of the tooth to cooperatively form a same layer. The winding start end and the winding terminal end are disposed at the proximal end portion of the tooth. And, the lead wire portions extend from the winding start end and the winding terminal end toward a core back of the stator core. According to the third concentrated winding stator coil of the present invention, the plural tooth coils cooperatively arrange a phase winding including plural serial coil units disposed in parallel with each other, each serial coil unit consisting of one or serially connected n (n is a positive integer equal to or larger than 2) tooth coils, and the turn number of the tooth coil is substantially equivalent to an odd turn number.

This invention relates to a concentrated winding stator coil for an electric rotary machine based on the proximal end extraction type two-layer winding arrangement. According to the proximal end extraction type two-layer winding arrangement, the winding work of the tooth coil starts from a position adjacent to the core back (i.e. from the proximal end portion of the tooth) until it reaches the distal end portion of the tooth to form the first layer coil. Then, turning the advancing direction, the winding work restarts from the distal end portion to the proximal end portion of the tooth to form the second layer coil. Thus, the second layer coil is disposed on the first layer coil so as to form a pair of layer coils. However, it is possible to add another pair of layer coils if necessary. In any case, even layer coils are wound around the tooth.

According to this arrangement, both of the winding start end and the winding terminal end of the tooth coil can be disposed at the proximal end portion of the tooth, i.e. closely to the core back of the stator core. Thus, it becomes possible to connect two tooth coils with a short crossover. This brings the effects of not only suppressing increase in the resistance loss but also locating the crossovers and the connect portions of the crossovers and the lead wire portions of the tooth coils far from the cylindrical surface of the rotor. As a result, it becomes possible to prevent the wires from contacting with the rotor. The work for installing the rotor into its housing becomes easier.

Furthermore, as both of the winding start end and the winding terminal end of the tooth coil can be disposed at the proximal end side of the tooth, the lead wires of the tooth coils and the crossovers can be disposed closely to the end face of the core back of the stator core. Thus, the axial length of the stator does not increase.

Especially, according to the first concentrated winding stator coil of the present invention, the second layer coil of the tooth coil has substantially no turn at the most proximal end portion of the tooth corresponding to the proximal end turn of the first layer coil, so that the tooth coil has an odd turn number. Thus, the first concentrated winding stator coil of the present invention can provide a tooth coil having an odd turn number while assuring the advantages of the above-described proximal end extraction type two-layer winding arrangement. The degree of freedom in designing an electric rotary machine using a concentrated winding stator can be increased.

Especially, according to the second concentrated winding stator coil of the present invention, third layer coil is disposed on and around the second layer coil. And, the third layer coil consists of only one turn disposed at the most proximal end portion of the tooth corresponding to the proximal end turn of the second layer coil, so that the tooth coil has an odd turn number. Thus, the second concentrated winding stator coil of the present invention can provide a tooth coil having an odd turn number while assuring the advantages of the above-described proximal end extraction type two-layer winding arrangement. The degree of freedom in designing an electric rotary machine using a concentrated winding stator can be increased.

Especially, according to the third concentrated winding stator coil of the present invention, the plural tooth coils cooperatively arrange a phase winding including plural serial coil units disposed in parallel with each other. Each serial coil unit consists of one or serially connected n (n is a positive integer equal to or larger than 2) tooth coils, and the turn number of the tooth coil is substantially equivalent to an odd turn number.

Thus, the third concentrated winding stator coil of the present invention can provide a tooth coil having substantially an odd turn number while assuring the advantages of the above-described proximal end extraction type two-layer winding arrangement. The degree of freedom in designing an electric rotary machine using a concentrated winding stator can be increased.

More specifically, it is now supposed that "i" represents the current flowing in the phase winding, "N" represents a turn number of the tooth coil, and the phase winding is arranged by serially connecting a total of "Y" tooth coils in parallel with each other. According to this arrangement, the phase current flowing in each tooth coil decreases to 1/Y level. This is equivalent to the reduction in the ampere-turn of one tooth coil from Ni to Ni/Y. In other words, this is equivalent to the reduction in the turn number of the tooth coil from N to N/Y. Accordingly, even if an actual turn number of the tooth coil is an even number, it is possible to realize a turn number that can be regarded as an odd number electromagnetically. For example, it is further supposed that the tooth coil has 30 turns and the phase windings, each consisting of 6 tooth coils, are connected in parallel with each other. According to this arrangement, the turn number of the tooth coil can be regarded as being substantially identical with 5 turns.

According to a preferred embodiment of the present invention, the phase winding is arranged by two serial coil units connected in parallel with each other, and each serial coil unit consists of tooth coils connected in series, with a number of the tooth coils being half a pole-pair number. This arrangement brings the effect of suppressing reduction in the current flowing in each tooth coil because the number of parallel units is 2 (i.e. the minimum number). Accordingly, it becomes possible to reduce the turn number of a tooth coil required for assuring an ampere-turn required for one tooth coil. The winding work of the tooth coil can be simplified. The coil resistance can be reduced.

According to a preferred embodiment of the present invention, the winding start end and the winding terminal end of the tooth coil are disposed at circumferential both sides of the proximal end portion of the tooth, and the pair of lead wire portions extend toward the core back of the stator core from the circumferential both sides of the proximal end portion of the tooth. According to this arrangement, both of the lead wire portions extending from the winding start and terminal ends of the tooth coil can be bent easily toward the radial direction by utilizing the edge portion of the core back facing to the slot bottom. This arrangement brings the effect of securing a sufficient clearance between the lead wire portions. The terminals of the lead wire portions can be easily processed.

According to a preferred embodiment of the present invention, the pair of lead wire portions are extended in the same axial direction from the circumferential both sides of the proximal end portion of the tooth toward the core back of the stator core. This arrangement brings the effect of simplifying the wiring connection work because the lead wire portions of the tooth coil can be connected with the crossovers (including the neutral crossover) at the same side of the core back of the stator core in the axial direction.

According to a preferred embodiment of the present invention, the concentrated winding stator coil further includes a required number of bus bars serving as crossovers or neutral points or phase terminals disposed adjacently to an axial end face of the core back at the side where the lead wire portions of the tooth coils are extended. The bus bars of different phases are disposed at different positions in the axial direction, and the crossover bus bars of the same phase are disposed at the same position in the axial direction. Moreover, the lead wire portions of the respective coils are connected to the bus bars. This arrangement brings the effects of realizing highly densified stator coils and shortening the lead wire portions because the crossovers, the neutral points, the phase terminals and other bus bars can be disposed adjacently to the tooth coil. The bus bars can be easily fixed to the core back by using an electric insulating holder. The lead wire portions of the tooth coil can be easily connected with the bus bars.

According to a preferred embodiment of the present invention, the concentrated winding stator coil further includes a bus bar holder fixed to an axial end face of the core back and having a predetermined number of bus bar accommodation grooves extending in the circumferential direction and disposed mutually adjacently in the axial direction so as to open outward in the radial direction. And, the bus bar accommodation grooves respectively accommodate the bus bars of the same phase. This arrangement brings the effect of realizing highly densified stator coils.

According to a preferred embodiment of the present invention, the bus bar accommodation groove of a predetermined phase accommodates a neutral bus bar. This arrangement brings the effect of realizing highly densified stator coils.

According to a preferred embodiment of the present invention, the tooth coil has 2n layer coils (n=1, 2, 3, - - - ). This arrangement brings the effect of providing a tooth coil having substantially an odd turn number while assuring the advantages of the above-described proximal end extraction type two-layer winding arrangement. The degree of freedom in designing an electric rotary machine using a concentrated winding stator can be increased.

According to a preferred embodiment of the present invention, the tooth coil has 4n−2 layer coils (n=1, 2, 3, - - - ). This arrangement brings the effect of providing a tooth coil having substantially an odd turn number while assuring the advantages of the above-described proximal end extraction type two-layer winding arrangement. The degree of freedom in designing an electric rotary machine using a concentrated winding stator can be increased.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

A concentrated winding stator coil for an electric rotary machine of the present invention will be explained based on the following embodiments.

First Embodiment

A concentrated winding stator coil for an electric rotary machine in accordance with a preferable embodiment of the present invention will be explained with reference to FIG. 1.

Figure 1A:
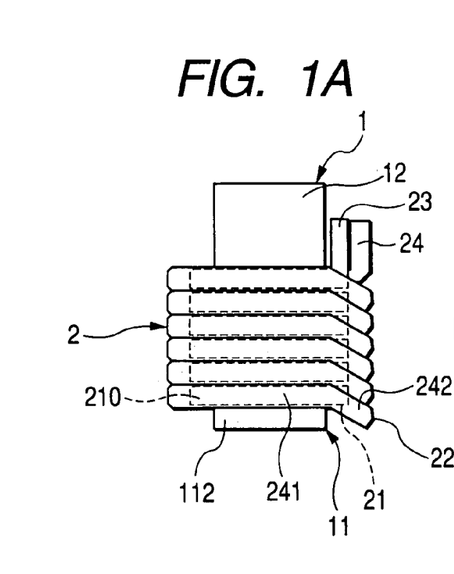
FIG. 1A is a left side view showing a tooth and a tooth coil used in a first embodiment of the present invention, seen from an arrow B direction.
Figure 1B:
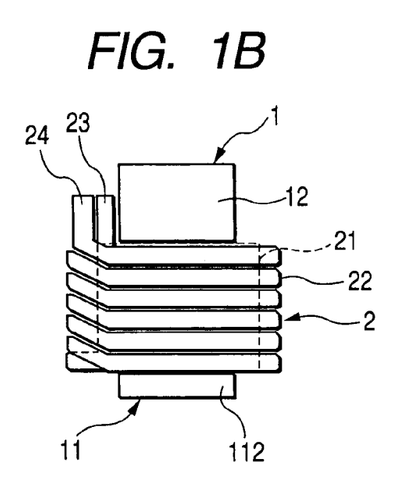
FIG. 1B is a right side view showing the tooth and the tooth coil used in the first embodiment of the present invention, seen from an arrow C direction.
Figure 1C:
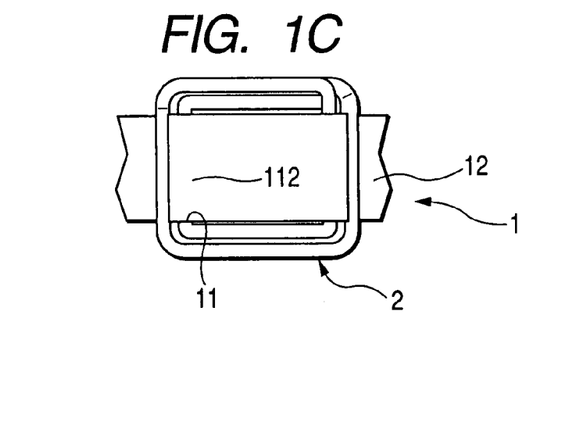
FIG. 1C is a bottom view showing the tooth and the tooth coil used in the first embodiment of the present invention, seen from an arrow D direction.
Figure 1D:
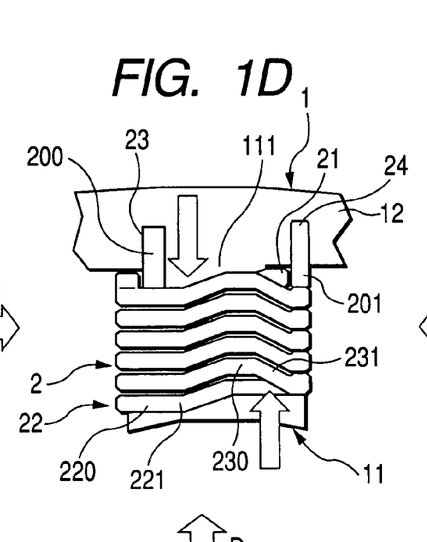
FIG. 1D is a front view showing the tooth and the tooth coil seen in the axial direction, taken along a plane extending in the radial direction.

FIG. 1D is a front view showing one tooth 11 of a stator core 1 and one tooth coil 2 wound around this tooth 11, seen in the axial direction. FIG. 1A is a left side view showing the tooth 11 and the tooth coil 2, seen from an arrow B direction. FIG. 1B is a right side view showing the tooth 11 and the tooth coil 2, seen from an arrow C direction. FIG. 1C is a bottom view showing the tooth 11 and the tooth coil 2, seen from an arrow D direction.

The stator core 1 consists of the tooth 11 and a core back 12 partly shown in FIG. 1D. The stator core 1 is arranged by multilayered electromagnetic plates. The stator core 1 has an assembled core structure.

Each tooth 11 protrudes inward in the radial direction from an inner cylindrical surface of the core back (i.e. yoke) 12. The teeth 11 are disposed at constant angular pitches in the circumferential direction. The tooth 11 has a main portion 111 of a square rod shape and a flange portion 112 formed at its distal end. The flange portion 112 has a predetermined thickness in the radial direction and protrudes in the circumferential direction from both sides thereof. The protruding length of the flange portion 112 is longer than a radial width of a later-described flat type wire. Each tooth 11 has a partially cylindrical surface located at the radial inner side thereof so as to confront with a rotor (not shown).

The tooth coil 2 is a flat type copper wire sheathed with a resin coating film and wound around the main portion 111 of a corresponding tooth 11 so as to form two layers of the coil. More specifically, the tooth coil 2 consists of a first layer coil 21 wound around the main portion 111 of the tooth 11, a second layer coil 22 wound on and around the first layer coil 21, a lead wire portion 23 extending from a winding start end of the first layer coil 21, and a lead wire portion 24 extending from a winding terminal end of the second layer coil 22. The first layer coil 21 has a final turn 210 at the distal end side of the tooth 11, i.e. at the position closest to the flange portion 112.

Each of the first layer coil 21 and the second layer coil 22 of the tooth coil 2 has a rectangular coil shape in cross section and forms one turn of a square shape consisting of four straight edges when wound around the main portion 111 (i.e. square rod portion) of the tooth 11. Of four edges, an edge corresponding to an axial end face of the stator core 1 where the lead wire portions 23 and 24 are extended is referred to as a front edge.

The lead wire portions 23 and 24 are disposed at both sides of the tooth 11 in the circumferential direction as shown in FIG. 1D, and are disposed at one side of the tooth 11 in the axial direction as shown in FIGS. 1A and 1B. The lead wire portions 23 and 24 extend substantially outward in the radial direction in parallel with the surface of the tooth 11. The lead wire portion 23 extends along a left side surface of the tooth 11 as shown in FIG. 1D. After reaching the proximal end portion of the tooth 11, the lead wire portion 23 is bent perpendicularly toward the back of the drawing sheet and merges into the winding start end of the first layer coil 21.

The first layer coil 21 has 6 turns arranged by successively winding the coil conductor around the main portion 111 of the tooth 11 in a direction advancing from the proximal end portion to the distal end portion of the tooth 11 so as to cooperatively form a same layer. The second layer coil 22 has plural turns arranged by successively winding in a direction advancing from the distal end portion to the proximal end portion of the tooth 11 so as to cooperatively form a same layer on the first layer coil 21. The second layer coil 22 has a start turn 220 continuously returned from the final turn 210 of the first layer coil. According to this arrangement, both of the winding start end and the winding terminal end of the tooth coil 2 are disposed at the proximal end portion of the tooth 11. More specifically, the winding work of the tooth coil 2 starts from a position adjacent to the core back (i.e. from the proximal end portion of the tooth 11) until it reaches the distal end portion of the tooth 11 to form the first layer coil 21. Then, turning the advancing direction, the winding work restarts from the distal end portion to the proximal end portion of the tooth 11 to form the second layer coil 22. Thus, the second layer coil 22 is arranged on the first layer coil 21. According to this embodiment, the tooth coil 2 includes a pair of layer coils. However, it is possible to add another pair of layer coils if necessary.

According to this arrangement, both of the winding start end and the winding terminal end of the tooth coil 2 can be disposed at the proximal end portion of the tooth 11, i.e. closely to the core back 12 of the stator core 1. Thus, it becomes possible to connect two tooth coils 2 with a short crossover. This brings the effects of not only suppressing increase in the resistance loss but also locating the crossovers and the connect portions of the crossovers and the lead wire portions 23 and 24 of the tooth coils 2 far from the cylindrical surface of the rotor. As a result, it becomes possible to prevent the wires from contacting with the rotor. The work for installing the rotor into its housing becomes easier. Furthermore, the crossover can be easily and surely supported by the stator core 1 without being interfered with the tooth coil 2.

Furthermore, according to this embodiment, the tooth coil 2 has a pair of lead wire portions 23 and 24 extending from the winding start end and the winding terminal end toward the core back of the stator core 1. Thus, it becomes possible to easily connect the lead wire portions of the tooth coil to the crossover bus bars being easily installed to the exposed core back of the stator core.

Furthermore, according to this embodiment, both of the winding start end 200 and the winding terminal end 201 of the tooth coil 2 can be disposed at circumferential both sides of the proximal end portion of the tooth 11. The lead wire portions 23 and 24 are extended toward the core back of the stator core from the circumferential both sides of the proximal end portion of the tooth 11. The lead wire portions 23 extending from the winding start end of the tooth coil 2 and the lead wire portions 24 extending from the winding terminal end of the tooth coil 2 are easily bent toward the radial direction by utilizing the edge portion of the core back facing to the slot bottom. This arrangement brings the effect of securing a sufficient clearance between the lead wire portions 23 and 24. The terminals of the lead wire portions 23 and 24 can be easily processed.

Furthermore, according to this embodiment, the pair of lead wire portions 23 and 24 are extended in the same axial direction from the circumferential both sides of the proximal end portion of the tooth 11 toward the core back 12 of the stator core 1. This arrangement brings the effect of simplifying the wiring connection work because the lead wire portions 23 and 24 of the tooth coil 2 can be connected with the crossovers (including the neutral crossover) at the same side of the core back 12 of the stator core 1 in the axial direction.

Figure 2:
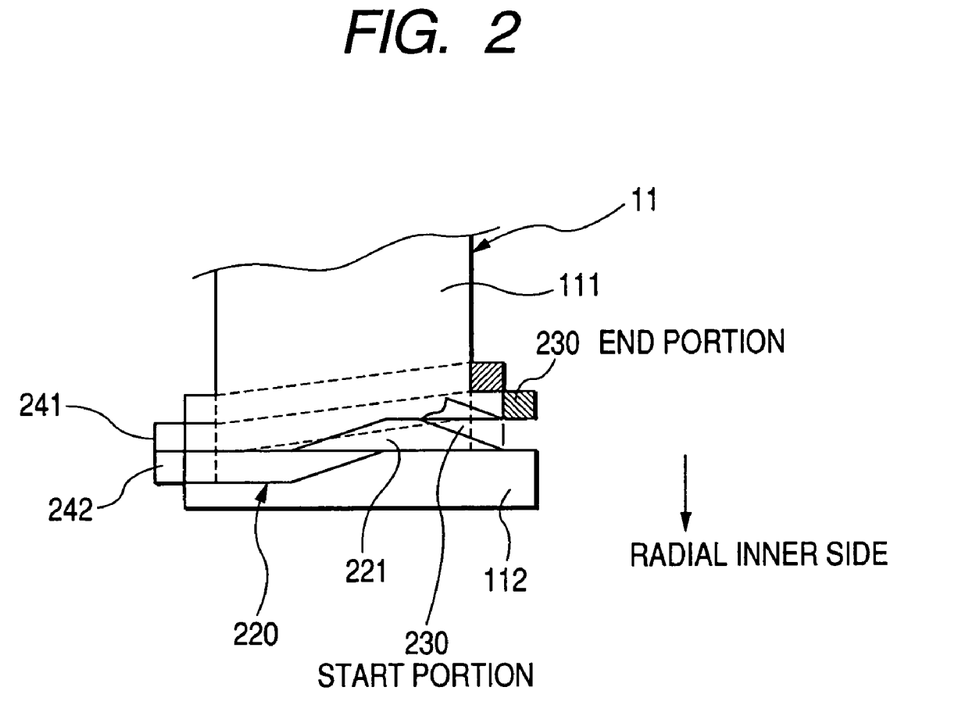
FIG. 2 is a front view showing a return portion of the tooth coil explained in FIGS. 1A to 1D, taken along a plane extending in the radial direction.

FIG. 2 shows a coil conductor continuously returning from the first layer coil 21 to the second layer coil 22, with the start turn 220 of the second layer coil 22. According to this embodiment, a start portion (i.e. front edge) 221 of the start turn 220 of the second layer coil 22 corresponds to an end portion (i.e. a final edge of 4 edges) of the final turn 210 of the first layer coil 21. According to this embodiment, the start portion 221 is shifted slightly early to the position identical with that of other turns of the second layer coil 22. Namely, the final turn of the first layer coil 21 is wound along three faces of the tooth 11 by an amount equivalent to ¾ of one turn, and terminates at the edge portion between the circumferential right side surface of the tooth 11 and the axial end face of the tooth 11 as shown in FIG. 2 and FIG. 1D.

The start portion (i.e. front edge) 221 of the start turn 220 of the second layer coil 22 is bent toward the distal end portion (i.e. toward the radial inner side) of the tooth 11, thereby preventing the start portion (i.e. front edge) 231 of the second turn 230 of the second layer coil 22 (positioned next to the start turn 220) from riding on the start portion 221 of the start turn 220 of the second layer coil 22 (refer to FIG. 1D).

Furthermore, the start portion (front edge) 231 of the second turn 230 of the second layer coil 22, especially its front end portion, is bent toward the proximal end portion (i.e. toward the radial outer side) of the tooth 11 and is disposed adjacently to the start portion (i.e. front edge) 221 of the start turn 220 of the second layer coil 22, thereby preventing the start portion 231 of the second turn 230 from riding on the start portion 221 of the start turn 220 of the second layer coil 22. According to this arrangement, turning the winding direction of the coil conductor from the first layer coil 21 to the second layer coil 22 forms a returning portion consisting of the final turn of first layer coil 21 and the start turn 220 of the second layer coil 22, without increasing the protrusion amount of the coil conductor (flat type wire) toward the circumferential direction of the stator core 1. Thus, the slot space factor can be maintained adequately. The second layer coil 2 can be wound around the tooth 11 so densely. Furthermore, as the start turn 220 and the second turn 230 of the second layer coil 22 are bent in mutually different directions, the required bend for each turn can be reduced.

Furthermore, the start portion (front edge) 231 of the second turn 230 of the second layer coil 22, especially its rear end, is bent along the start portion (front edge) 221 of the start turn 220 of the second layer coil 22. Similarly, other turns of the second layer coil 22 are successively wound along the above-described bent shape of the start portion (front edge) of the second turn 230 of the second layer coil 22. This arrangement brings the effect of avoiding spatial or electrical interference because the final turn of the second layer coil 22 does not ride on the lead wire portion 23 at or near the portion where the coil conductor is bent along the side surface of the tooth 11 from the start portion (front edge) of the final turn of the second layer coil 22.

An upward arrow shown in FIG. 1D indicates respective turns of the second layer coil 22 being bent upward (i.e. outward in the radial direction) except the front edge of the start turn 220. A downward arrow shown in FIG. 1D indicates the front edges of respective turns of the second layer coil 22 being bent downward (i.e. inward in the radial direction). According to this arrangement, it becomes possible to prevent the start portion (i.e. front edge) 231 of the second turn 230 from riding on the start portion (i.e. front edge) 221 of the start turn 220, although respective turns of the second layer coil 22 are disposed on the first layer coil 21. As shown in FIG. 1A, the start turn 220 of the second layer coil 22 has the second edge consisting of a straight portion 241 and an inclined portion 242. The inclined portion 242 of the second edge is continuous and bent substantially perpendicularly from the start portion 221 of the start turn 220 of the second layer coil 22, and merges into the straight portion 241 of the second edge on the side surface of the tooth 11. The straight portion 241 is disposed at the most distal end portion of the main portion 111 of the tooth 11.

According to this embodiment, the above-described bending of the second layer coil 22 in the radial direction is performed on the axial end face of the stator core 1 where the lead wire portions 23 and 24 are extended. Thus, the bending work can be easily performed compared with a case that such bending work is performed on the side face of the tooth in the circumferential direction.

Figure 3:
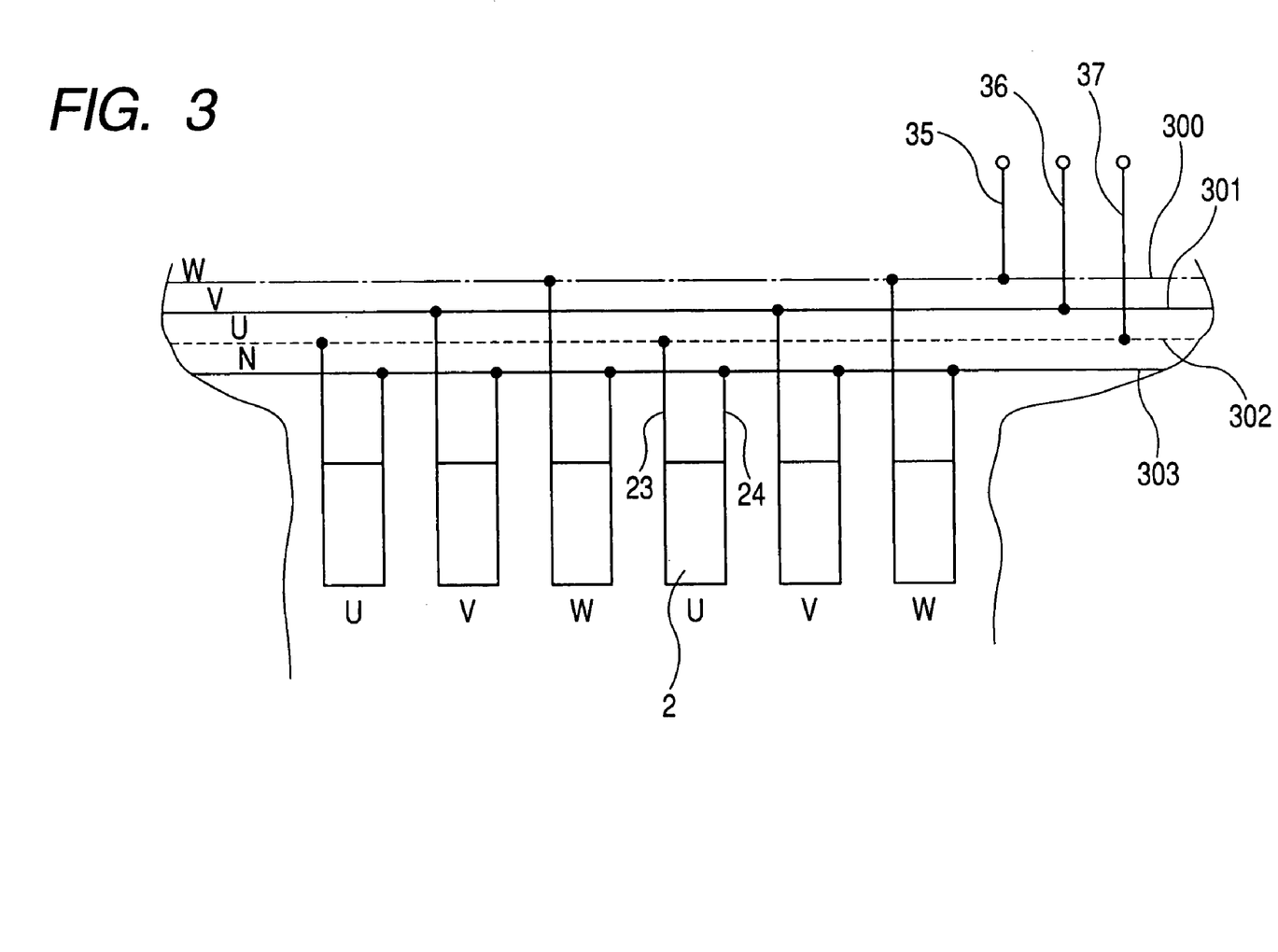
FIG. 3 is an expansion plan view partly showing a three-phase star-connection stator having tooth coils being connected in parallel with each other.

FIG. 3 is an expanded wiring diagram shows a three-phase stator coil arranged by connecting tooth coils 2 of FIGS. 1A to 1D and 2 in parallel with each other to form each phase. Each tooth coil 2 has a par of lead wire portions 23 and 24, being connected to a W-phase bus bar 300, a V-phase bus bar 301, a U-phase bus bar 302, or a neutral bus bar 303. Furthermore, the stator coil includes a W-phase external lead terminal 35, a V-phase external lead terminal 36, and a U-phase external lead terminal 37. Respective tooth coils 2 of the three-phase stator coil are disposed to arrange the U-, V-, W-, U-, - - - phases in the circumferential direction. The U-phase bus bar 302, the V-phase bus bar 301, the W-phase bus bar 300, and the neutral bus bar 303 are separately accommodated in four grooves of a resin-made bus bar holder. The bus bar holder has a ring shaped body and fixed to the end face of the core back by means of screws. This arrangement is effective in shortening the lead wire portions 23 and 24, reducing the resistance loss, and simply constituting a concentrated winding stator of three-phase star connection (refer to FIG. 4).

Figure 5:
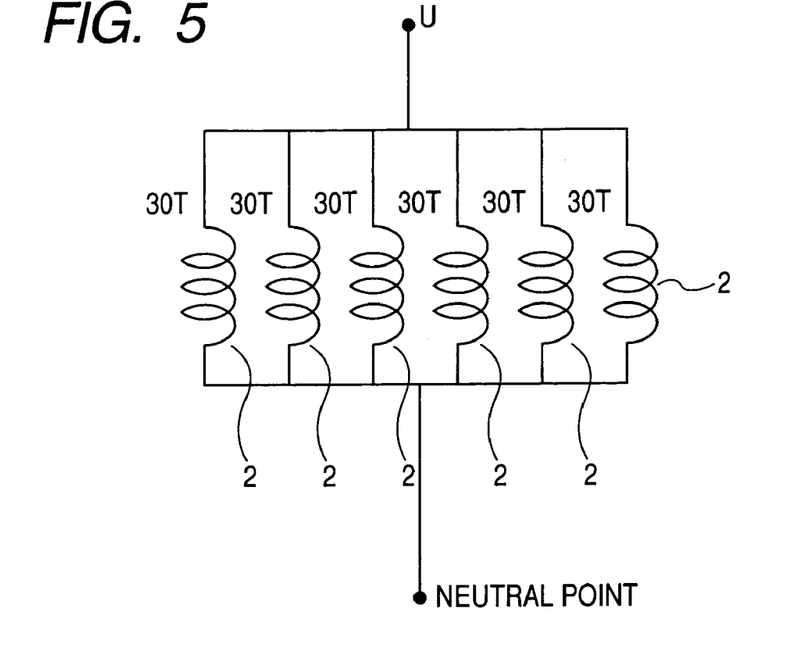
FIG. 5 is a circuit diagram showing a phase winding used for the stator shown in FIG. 3.

Hereinafter, characteristic features of this embodiment will be explained with reference to FIG. 5.

Figure 4:
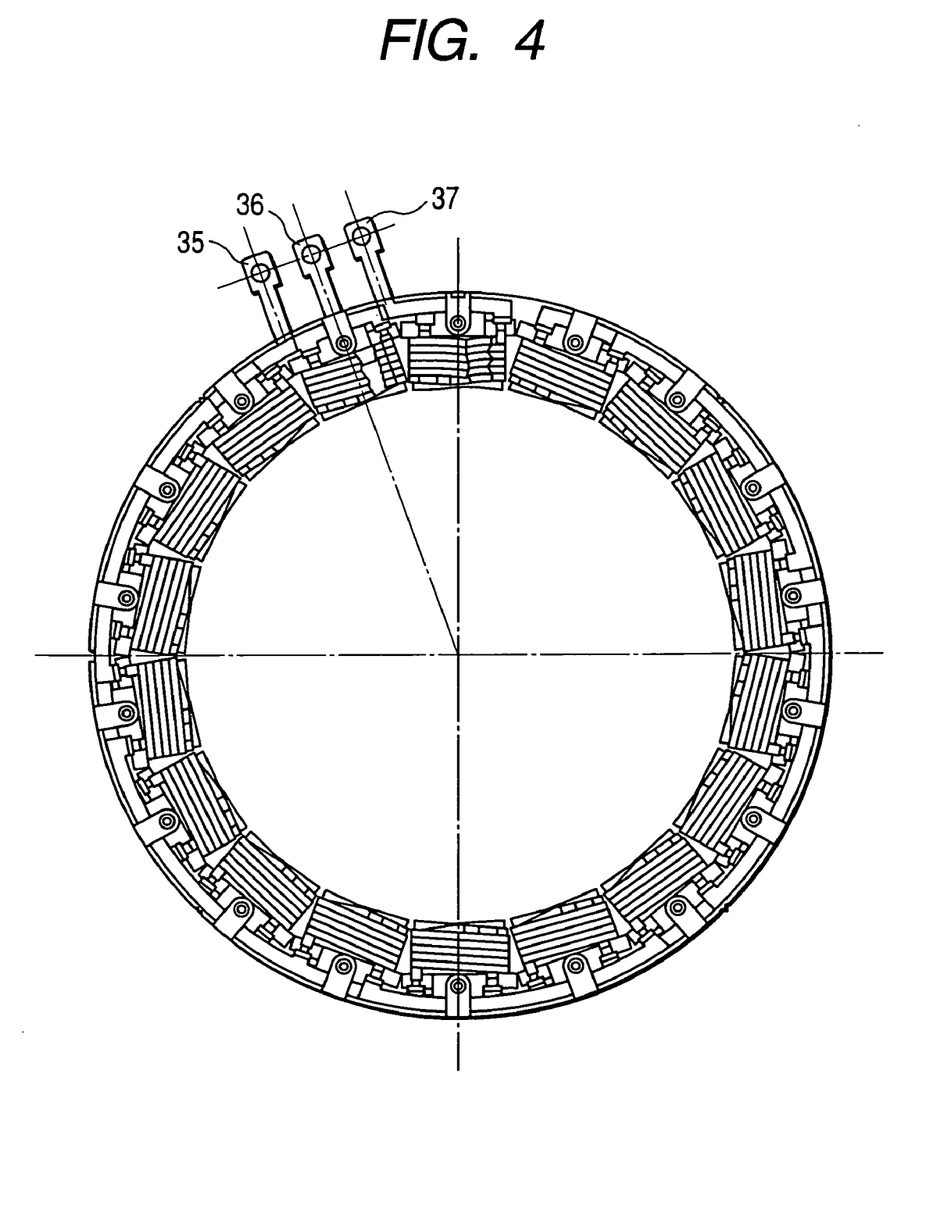
FIG. 4 is a front view showing a stator using stator coils shown in FIG. 3, taken along a plane extending in the radial direction.

According to this embodiment, each tooth coil 2 has the first layer coil 21 of 15 turns and the second layer coil 22 of 15 turns, i.e. 30 turns in total. The stator, as shown in FIG. 4, has six tooth coils 2 for each phase. The tooth coils 2 of the same phase are connected in parallel with each other as shown in FIG. 5. Accordingly, the current flowing in each tooth coil 2 is ⅙ of the phase current "i" supplied from the outside. This is equivalent to the serial circuit arrangement of the tooth coils 2 having 5 turns. In other words, even if the tooth coil 2 has 30 turns (i.e. even turn number), it becomes possible to realize the tooth coil of substantially 5 turns (i.e. odd turn number). In other words, it becomes possible to design the armature on the assumption that each tooth coil has an ampere-turn of 5i.

Second Embodiment

Figure 6:
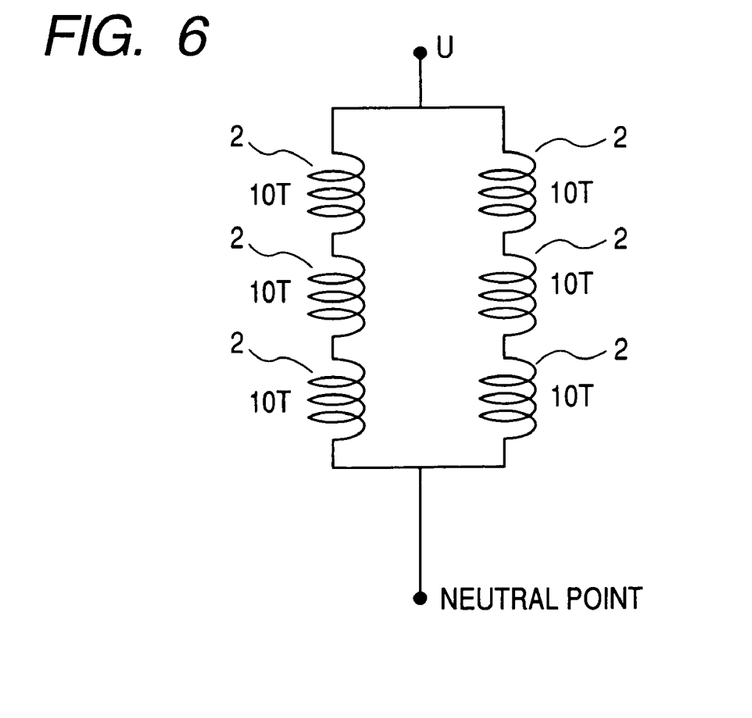
FIG. 6 is a circuit diagram showing a phase winding used in a second embodiment of the present invention.

A concentrated winding stator coil for an electric rotary machine in accordance with a second embodiment of this invention will be explained with reference to FIG. 6. According to the first embodiment, even if each tooth coil 2 has an even turn number, all of tooth coils 2 having the same phase are connected in parallel with each other to realize the tooth coils 2 which are regarded as having an odd turn number if serially connected with each other. However, connecting all of the tooth coils 2 having the same phase in parallel with each other as shown in FIG. 5 will decrease the current flowing in one tooth coil 2. To compensate such current reduction, it will be necessary to increase the turn number of the tooth coil 2 by winding a thin conductor wire as many as necessary. In this respect, this embodiment uses only two parallel circuits (i.e. the parallel circuit number is limited to 2) as shown in FIG. 6. This arrangement brings the effect of increasing the current amount flowing in each tooth coil 2 up to three times the current amount in the first embodiment. The turn number of ach tooth coil 2 can be reduced to ⅓ of that of the tooth coil 2 shown in FIG. 5.

More specifically, according to the arrangement shown in FIG. 6, each tooth coil 2 has 10 turns. Three tooth coils 2 of the same phase are serially connected as a serial coil unit. Two serial coil units are connected in parallel with each other to arrange one phase winding. This arrangement brings the effect of simplifying the winding work of the coil conductor because the turn number of each tooth coil 2 can be reduced. Furthermore, as the number of parallel circuits is two, it is desirable that the lead wires are connected to one crossover bus bar extending in the clockwise direction to reach one serial coil unit and to another crossover bus bar extending in the counterclockwise direction to reach the other serial coil unit. Thus, the arrangement of the bus bars can be simplified.

Third Embodiment

Figure 7:
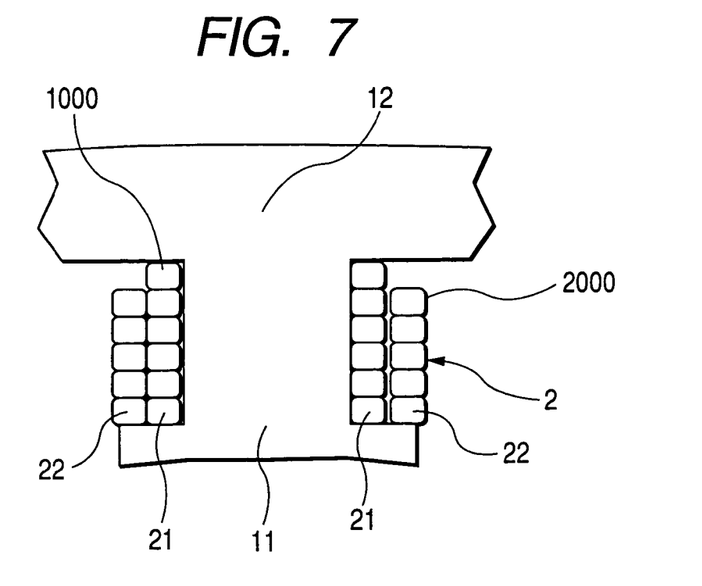
FIG. 7 is a front view showing a tooth coil used in a third embodiment of the present invention, taken along a plane extending in the radial direction.

A concentrated winding stator coil for an electric rotary machine in accordance with a third embodiment of the present invention will be explained hereinafter with reference to FIG. 7. The first layer coil 21 has a start turn 1000, and the second layer coil 22 has a final turn 2000. According to the first and second embodiments, even if each tooth coil 2 has an even turn number, the parallel connection is employed to realize the tooth coils which are regarded as having an odd turn number if serially connected with each other. On the other hand, this embodiment omits the final turn of the second layer coil 22 shown in the first embodiment (i.e. one turn connected to the winding terminal end of the tooth coil 2 positioned closely to the core back 12). This embodiment brings the effects of not only satisfying the requirement that the winding start end and the winding terminal end of the tooth coil 2 are disposed at the proximal end portion of the tooth 11, i.e. closely to the core back 12 of the stator core 1, but also easily realizing the tooth coil 2 of odd turn number while.

Fourth Embodiment

Figure 8:
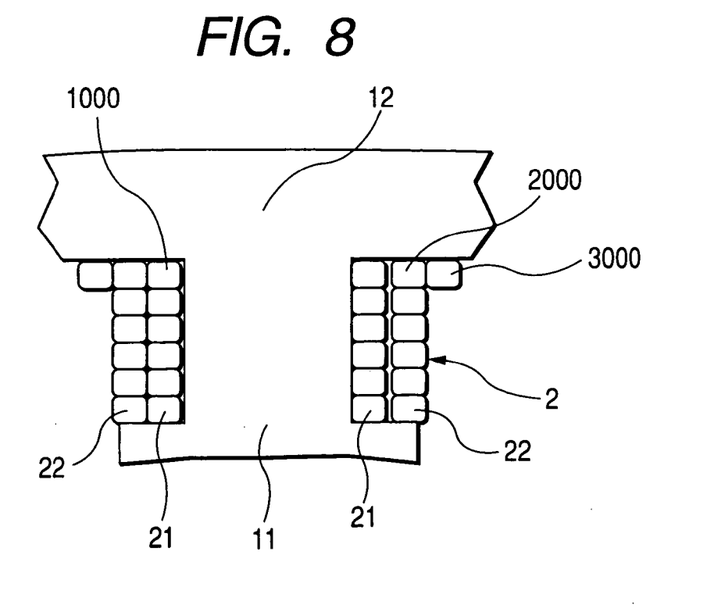
FIG. 8 is a front view showing a tooth coil used in a fourth embodiment of the present invention, taken along a plane extending in the radial direction.

A concentrated winding stator coil for an electric rotary machine in accordance with a fourth embodiment of the present invention will be explained hereinafter with reference to FIG. 8. According to this embodiment, as shown in FIG. 8, a third layer coil of only one turn 3000 is disposed on the final turn 2000 of the second layer coil 22. This arrangement brings the effects of not only realizing the tooth coil 2 of odd turn number but also increasing the ampere-turn of the tooth coil 2 without changing the size or specs of the electric rotary machine. In general, according to a concentrated winding stator, it is possible to set the circumferential width of a tooth to be substantially constant at any position in the radial direction. In such a case, the circumferential width of a slot is larger at the bottom of the slot (i.e. the radial outermost end according to the inner rotor) than the opening of the slot (i.e. the radial innermost end according to the inner rotor). Based on this fact, to effectively utilize a space available for the winding, this embodiment proposes to add one turn 3000 as a third layer coil disposed on the final turn of the second layer coil 22 by continuously winding the coil conductor on the final turn 2000 of the second layer coil 22. According to this embodiment, both the final turn 2000 of the second layer coil 22 and the turn 3000 of the third layer coil are located closely to the core back 12. Thus, the winding terminal end of the tooth coil 2 can be disposed adjacently to the core back 12. The length of the lead wire extending from this winding terminal end outward in the radial direction can be shortened. The coil resistance does not increase.

What is claimed is:

1. A stator for an electric rotary machine, comprising:
a stator core having a plurality of teeth; and
an insulation coated coil conductor wound around each of the teeth of the stator core as a tooth coil,
wherein each insulation coated coil conductor comprises:
a first layer coil wound around the corresponding tooth so as to advance from a proximal end portion of said tooth to a distal end portion of said tooth; and
a second layer coil provided on the first layer coil and wound around the tooth so as to advance from the distal end portion to the proximal end portion of said tooth; and
wherein said tooth coils are classified into a plurality of phase windings respectively corresponding to a plurality of different phases such that each winding receives a phase current,
each phase winding has N (N is an even number equal to or larger than 2) serial coil units connected in parallel with one another;
each serial coil unit has plural tooth coils serially connected with one another such that each tooth coil receives a coil current which has a strength equal to 1/N of a strength of the phase current, and
a total number of turns in each tooth coil is a limited even number which is N times of a certain odd number such that each tooth coil receiving the coil current is equivalent to a virtual tooth coil which receives the phase current and has turns set at the certain odd number.

2. The stator in accordance with claim 1, wherein
the winding start end and the winding terminal end of said tooth coil are disposed at circumferential both sides of the proximal end portion of said tooth, and
said pair of lead wire portions extend toward the core back of said stator core from said circumferential both sides of the proximal end portion of said tooth.

3. The stator in accordance with claim 1, wherein
said lead wire portions respectively connected with the winding start ends and the winding terminal ends of the tooth coils are extended in the same axial direction from the circumferential both sides of the proximal end portion of said tooth toward the core back of said stator core.

4. The stator in accordance with claim 1, further comprising a required number of bus bars serving as crossovers or neutral points or phase terminals disposed adjacently to an axial end face of said core back at a side where lead wire portions respectively connected with a winding start end and a winding terminal end of each tooth coil are extended, wherein
the bus bars of different phases are disposed at different positions in an axial direction of the stator core, and the bus bars of the same phase serving as the crossovers are disposed at the same position in the axial direction, and the lead wire portions connected with said respective tooth coils are connected to said bus bars.

5. The stator in accordance with claim 4, further comprising a bus bar holder fixed to an axial end face of said core back and having a predetermined number of bus bar accommodation grooves extending in the circumferential direction and disposed mutually adjacently in the axial direction so as to open outward in the radial direction, wherein said bus bar accommodation grooves respectively accommodate the bus bars of the same phase.

6. The stator in accordance with claim 5, wherein said bus bar accommodation groove of a predetermined phase accommodates a neutral bus bar.

7. The stator in accordance with claim 1, wherein said tooth coil has 4n−2 layer coils (n =1, 2, 3, - - - ).

8. The stator in accordance with claim 1, wherein the insulation coated coil conductor is bent at a winding terminal end of the second layer coil and extends outward in a radial direction of the stator core in parallel with a surface of the tooth.

9. The stator in accordance with claim 1, wherein the insulation coated coil conductor is bent at a winding terminal end of the second layer coil and extends outward in a radial direction of the stator core without being directed toward a circumferential direction of the stator core.

* * * * *